(12) United States Patent
Ashino et al.

(10) Patent No.: US 9,905,366 B2
(45) Date of Patent: Feb. 27, 2018

(54) LEAD TERMINAL FOR CAPACITOR

(71) Applicant: NIPPON CHEMI-CON CORPORATION, Shinagawa-ku, Tokyo (JP)

(72) Inventors: Hirotsugu Ashino, Tokyo (JP); Takahiro Yoshida, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 15/275,467

(22) Filed: Sep. 25, 2016

(65) Prior Publication Data
US 2017/0011859 A1    Jan. 12, 2017

Related U.S. Application Data

(63) Continuation of application No. PCT/JP2015/059698, filed on Mar. 27, 2015.

(30) Foreign Application Priority Data

Mar. 27, 2014 (JP) ................. 2014-066078

(51) Int. Cl.
*H01G 9/008* (2006.01)
*H01G 9/035* (2006.01)
*H01G 9/08* (2006.01)

(52) U.S. Cl.
CPC ............. *H01G 9/008* (2013.01); *H01G 9/035* (2013.01); *H01G 9/08* (2013.01)

(58) Field of Classification Search
None
See application file for complete search history.

(56) References Cited

U.S. PATENT DOCUMENTS 4,037,142 A * 7/1977 Poole .................. H01G 9/10
174/520
6,310,756 B1 * 10/2001 Miura .................. H01G 9/00
361/301.3

(Continued)

FOREIGN PATENT DOCUMENTS

JP    H07-130576 A    5/1995
JP    2001-210551 A    8/2001

(Continued)

OTHER PUBLICATIONS

International Search Report from International Patent Application No. PCT/JP2015/059698, dated May 26, 2015.

*Primary Examiner* — Dion R Ferguson
(74) *Attorney, Agent, or Firm* — Shapiro, Gabor and Rosenberger, PLLC

(57) ABSTRACT

A lead terminal for a capacitor which is less likely to be broken even when the capacitor implemented on a substrate is continuously subjected to vibration, has excellent in vibration resistance and lifetime characteristics and capable of being manufactured inexpensively, is provided. The lead terminal 1 for a capacitor has an aluminum wire 2 having a round bar portion 2a and a flat portion 2b, and a metal wire 3 welded to the round bar portion 2a of the aluminum wire 2. Furthermore, the lead terminal 1 for a capacitor has a curved portion 2c at a boundary section between the round bar portion 2a and the flat portion 2b, and a curvature radius R of the curved portion 2c is set to be equal to or greater than 0.5 mm.

6 Claims, 8 Drawing Sheets

(56) References Cited

U.S. PATENT DOCUMENTS

2013/0279080 A1* 10/2013 Aoyama ................ H01G 9/008
 361/534
2015/0016025 A1* 1/2015 Yanaka .................. H01G 9/008
 361/518

FOREIGN PATENT DOCUMENTS

| JP | 2003-217972 A | 7/2003 |
| JP | 2003-257799 A | 9/2003 |
| JP | 2009-277748 A | 11/2009 |

* cited by examiner

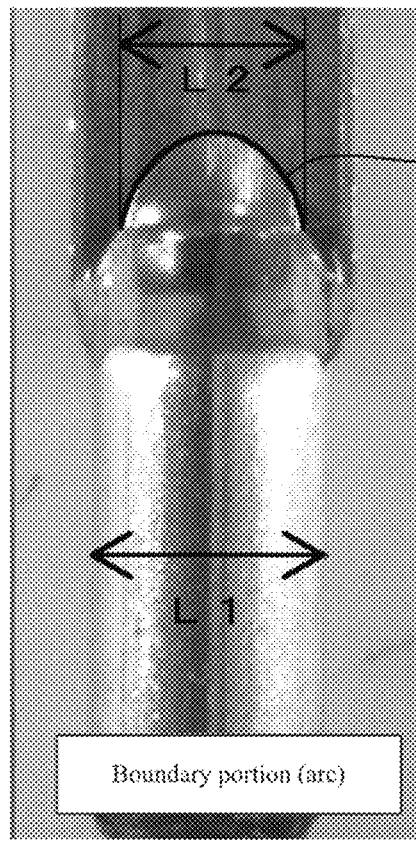
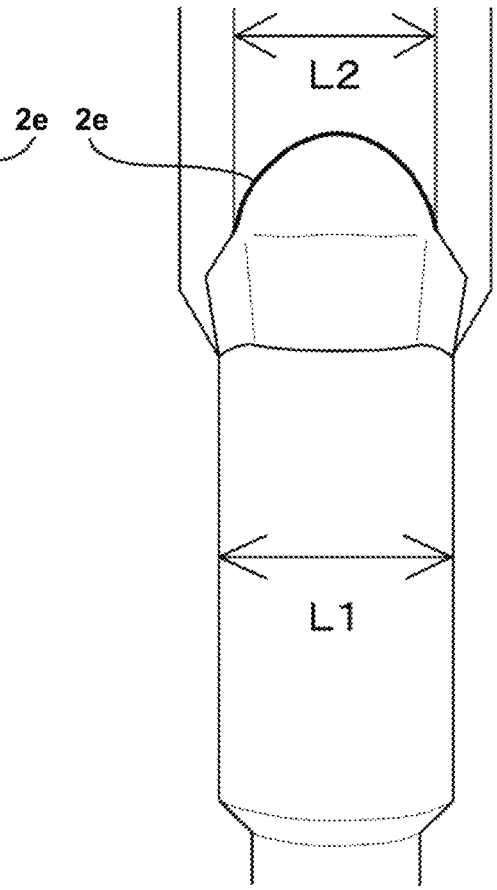
FIG. 6(a)　　　　　　　FIG. 6(b)
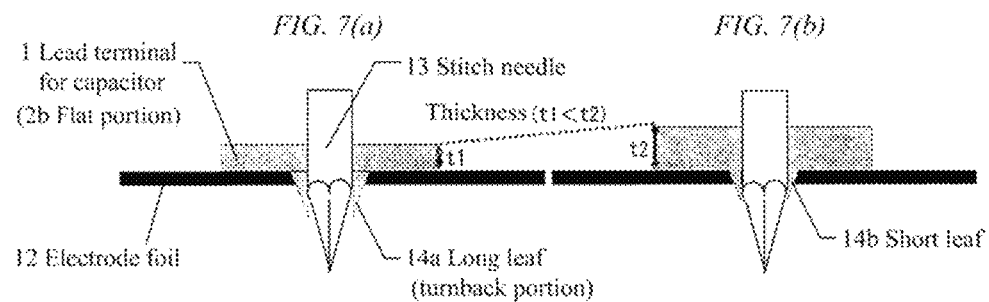
FIG. 7(a)　　　　　　　FIG. 7(b)

Table 2

| | Conventional example | Comparative example1 | Example 1 |
|---|---|---|---|
| Shape of curved portion | No curve | R = 0.25 mm | R = 0.5 mm |
| CAE image |  |  |  |
| Maximum stress | 104Mpa | 95Mpa | 65Mpa |
| Maximum stress reduction rate | — | -8.7% | -37.5% |
| Vibration resistance ratio | — | 1.77 times | 19.1 times |

…

LEAD TERMINAL FOR CAPACITOR

CROSS-REFERENCE TO RELATED APPLICATION

This application is a Continuation of PCT Application No. PCT/JP2015/059698, filed on Mar. 27, 2015, and claims priority to Japanese Patent Application No. 2014-066078, filed on Mar. 27, 2014, the entire contents all which are incorporated herein by reference.

TECHNICAL FIELD

The present invention relates to a lead terminal for a capacitor to be connected to a capacitor element.

BACKGROUND ART

In recent years, computerization of cars has been advanced, and the opportunities of using a capacitor in a vehicle onboard device are increasing. The capacitor is connected to a bus bar of a substrate or a module, of the vehicle onboard device via a lead terminal for a capacitor. In the vehicle onboard device, vibration from road and vibration due to rotation of an engine and the like, etc. during driving is continuously applied to the module or the substrate. Consequently, the continuous vibration is applied also to the capacitor implemented on the module and the substrate. As a result, a trouble such as breakage of the lead terminal for a capacitor may occur.

FIG. 10 illustrates the structure of a conventional lead terminal for a capacitor.

The lead terminal 5 for a capacitor is composed of an aluminum wire 2 and a metal wire 3, and the aluminum wire 2 and the metal wire 3 are connected by arc welding or the like. Furthermore, the aluminum wire 2 has a round bar portion 2a having a substantially cylindrical shape, and a flat portion 2b formed by subjecting the round bar portion 2a to a press working or the like, and an inclined portion 2d with a thickness that linearly decreases to the thickness of the flat portion 2b is formed on the flat portion 2b side of the round bar portion 2a. Furthermore, to the flat portion 2b, an electrode foil (not illustrated) of a capacitor element is connected.

A mechanism leading to a breakage due to the stress caused by vibration when the lead terminal 5 for a capacitor having the above structure is used for an electrolytic capacitor will be described with reference to FIG. 11.

As illustrated in FIG. 11, the electrolytic capacitor 10 is formed by housing, together with electrolyte solution for driving, a capacitor element 9 in a cylindrical outer case having a bottom, and sealing an opening formed on the outer casing with sealing body 8, where the capacitor element 9 is configured by winding or laminating electrode foils, which are positive electrode and negative electrode formed of aluminum or the like, with a separator interposed therebetween. Furthermore, in the electrolytic capacitor 10, two lead terminals 5 for capacitor are inserted into respective through holes of a substrate 6, and fixed to the substrate 6 with solder 7 from the back surface of the substrate 6.

Furthermore, in the module, the lead terminal 5 for a capacitor is electrically connected to other electronic components or the like by connecting the lead terminal 5 for a capacitor to the bus bar.

When the substrate 6 is vibrated in the directions of the arrows F parallel to the substrate surface, since the metal wire 3 of the lead terminal 5 for a capacitor is fixed to the substrate 6 with the solder 7, the metal wire 3 vibrates in the directions of the arrows F in a same manner. Consequently, the round bar portion 2a of the aluminum wire 2 connected to the metal wire 3 by arc welding or the like also vibrates in the directions of the arrows F in a same manner. Therefore, the flat portion 2b of the aluminum wire 2 connected to the electrode foils of the capacitor element 9 vibrates in the directions of arrow f from a boundary portion 2e between the round bar portion 2a and the flat portion 2b as a starting point.

As a result, the boundary portion 2e that becomes the starting point of the vibration is alternately intensively subjected to tensile stress and compressive stress as bending moment, which may cause metallic fatigue in the case of continuous vibration, causing breakage of the boundary portion 2e.

As a capacitor with excellent vibration resistance to such vibration, a structure having increased adhesiveness between the sealing body 8 for sealing openings of the case of the capacitor and the capacitor element 9 is increased to prevent movement of the capacitor element 9 has been suggested. See, for example, JP 2009-277748 A (Patent Literature 1). Furthermore, a suggestion to suppress the vibration of the capacitor itself by providing a projection piece between the sealing body 8 and the substrate 6 has also been made. See, for example, JP 2003-257799 A (Patent Literature 2).

However, vibration resistance is still insufficient in such proposals, and further improvement of vibration resistance has been desired. Furthermore, since such suggestions prevent vibration by making a structural change to the capacitor element, the existing facility used for manufacture are needed to be changed, also increasing cost disadvantageously.

SUMMARY OF THE INVENTION

Problems to be Solved

As another method to improve vibration resistance, there is a method to fix the capacitor element with fixing agent. However, in order to firmly fix the capacitor element, the amount of the fixing agent to be filled in the case has to be increased. Therefore, there is a problem that the allowed space in the case when inner pressure rises during the usage of the capacitor reduces, making a safety device such as a pressure valve readily operate, resulting in shortening the lifetime of the capacitor. Furthermore, the fixing agent softens under high temperature depending on its type, deteriorating fixing properties. In contrast, when the silicon type fixing agent adaptable to high temperature is used, there is a problem that the gas generated by siloxane bond increases the pressure in the capacitor, making a safety device such as a pressure valve to operate.

Furthermore, there is also a method to fix the element by swaging the side surface of the case. However, since this method needs a process to swage the side surface of the case along with the sealing of the capacitor, there is a problem that the processing costs increasing unit price.

The present invention is suggested to solve such problems, and the object thereof is to provide a lead terminal for a capacitor that is less likely to be broken even when the capacitor implemented on a substrate continuously subjected to vibration, has an excellent vibration resistance and lifetime characteristics, and is capable of being manufactured inexpensively.

Solution to Problem

To achieve the above object, a lead terminal for a capacitor of the present invention comprises an aluminum wire having a round bar portion and a flat portion, a metal wire connected to the round bar portion of the aluminum wire, and an inclined portion including at least a curved portion at a boundary section between the round bar portion and the flat portion, wherein the curved portion has a curvature radius R equal to or greater than 0.5 mm.

Advantageous Effects of Invention

According to the present invention, the lead terminal for a capacitor used has the curved portion formed to have a curved shape is at least provided at the boundary section between the round bar portion and the flat portion of the aluminum wire, and the curvature radius R of the curved portion is made to be not less than 0.5 mm. Therefore, the lead terminal for a capacitor becomes less likely to be broken even when the capacitor is continuously subjected to vibration, and has excellent vibration resistance and lifetime characteristics. Furthermore, the lead terminal for a capacitor is capable of being manufactured by changing only the mold for press working, so that the lead terminal for a capacitor is advantageous also in cost performance.

BRIEF DESCRIPTION OF DRAWINGS

FIGS. 6(a) and 6(b) each show a top view of the lead terminal for a capacitor of the invention when the boundary portion between the inclined portion and the flat portion is made to be the arc.

FIGS. 7(a) and 7(b) are schematic views illustrating an effect of the lead terminal for a capacitor according to the embodiment, in which FIG. 7(a) is of a case when the thickness is $t_1$, and FIG. 7(b) is of a case when the thickness is $t_2$ ($t_1 < t_2$).

DESCRIPTION OF EMBODIMENTS

Hereinafter, embodiments of a lead terminal for a capacitor according to the invention will be described in detail with reference to the drawings.

(Structure of Lead Terminal for Capacitor)

Figure 1:
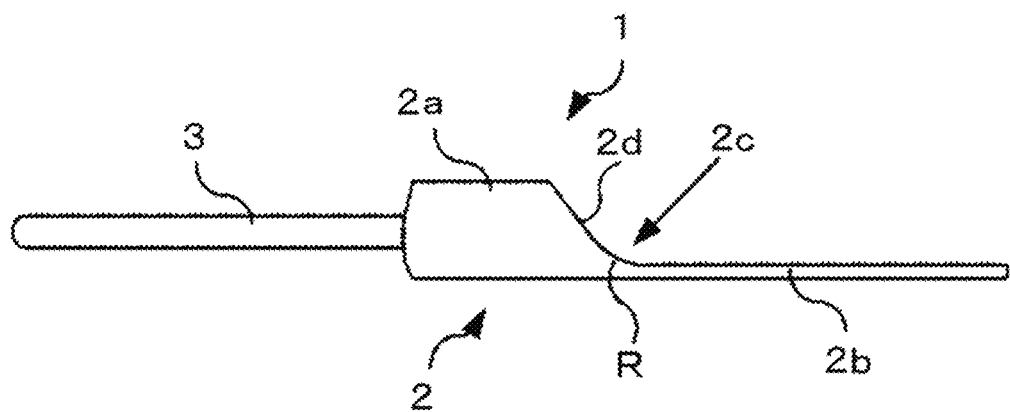
FIG. 1 is a plan view of a lead terminal for a capacitor according to an embodiment of the invention.

FIG. 1 illustrates a lead terminal for a capacitor according to an embodiment of the invention.

The lead terminal 1 for a capacitor is composed of an aluminum wire 2 and a metal wire 3, and the aluminum wire 2 and the metal wire 3 are connected by arc welding or the like. The aluminum wire 2 has a round bar portion 2a having a substantially cylindrical shape, a flat portion 2b formed by subjecting the round bar portion 2a to press working or the like. An inclined portion 2d with thickness that linearly decreases and a curvedly-formed curved portion 2c are formed in a boundary section between the round bar portion 2a and the flat portion 2b.

The flat portion 2b is formed by compressing and deforming an end of the aluminum wire 2 by a predetermined length by subjecting an end of the aluminum wire 2 to a press working or the like. On the other hand, the portion not subjected to press working or the like becomes the round bar portion 2a. The flat portion 2b is thinner than the round bar portion 2a, and has a wide shape. The flat portion 2b is a portion for connecting thereto an electrode foil of the capacitor.

The metal wire 3 is extended by a predetermined length from the end of the round bar portion 2a on the side opposite to the end where the flat portion 2b is formed. An end surface of the round bar portion 2a and an end surface of the metal wire 3 are in contact with each other, and are connected by arc welding or the like.

For the metal wire 3, a copper-plated steel wire (CP wire) having a surface plated typically with lead, tin or the like can be used.

(Curvature Radius R of Curved Portion)

Figure 2:
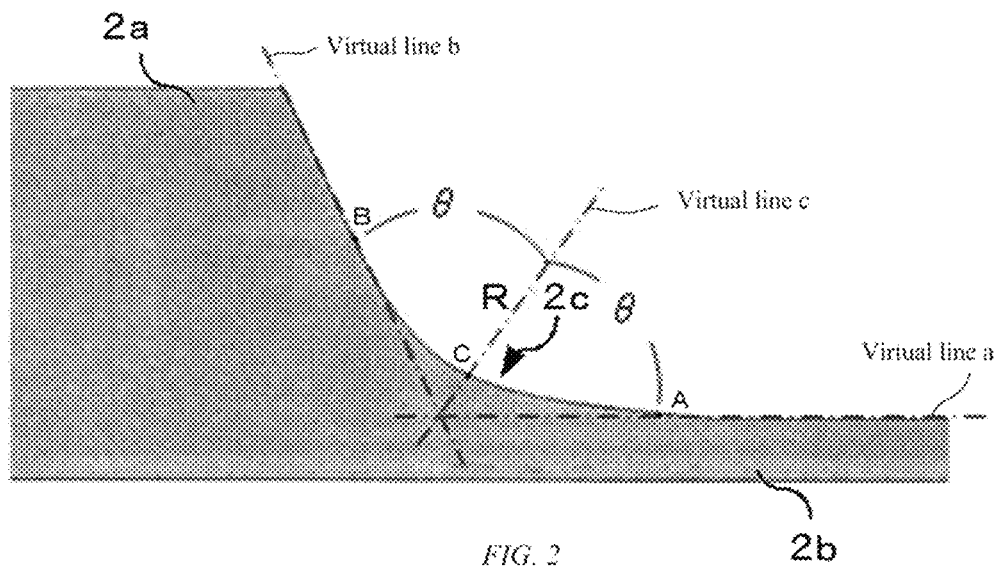
FIG. 2 is an enlarged view of a curved portion of the lead terminal for a capacitor according to the embodiment.

FIG. 2 is an enlarged view of the curved portion 2c of the lead terminal for a capacitor according to the embodiment.

In the curved portion 2c, the curvature radius R can be determined as described below.

(1) Regard a line parallel to a surface of the flat portion 2b as a virtual line a.
(2) Draw a straight line from the round bar portion 2a to the flat portion 2b, and regard the line as a virtual line b.
(3) Draw a virtual line c from the intersection of the virtual line a and the virtual line b to equally divide the angle made by the virtual line a and the virtual line b, and regard the intersection of the surface of the curved portion 2c and the virtual line c as C.
(4) Drawing a virtual circle using the starting end A, the terminal end B, and the intersection C of the curve makes the radius of the virtual circle which is the curvature radius R.

According to the results of the following examples, by making the curvature radius R of the curved portion 2c equal to or greater than 0.5 mm, it is possible to largely improve vibration resistance. Although the upper limit of the curvature radius R is not specifically limited, it is preferable that the curvature radius R to be up to 2.0 mm from the viewpoints of the dimension and strength of a capacitor element as a product. The larger the curvature radius R, the longer the length of the curved portion 2c become. The curved portion 2c has the surface curved and recessed. Therefore, the curved potion 2c is unsuitable for connection point to the electrode foil. Furthermore, although sealing body and the capacitor element are integrated by making the lead terminal 1 for a capacitor pass through a through hole provided in the sealing body, the curved portion 2c of the lead terminal 1 for a capacitor is recessed more than the surface of the round bar portion 2a. Therefore, the curved portion 2c fails to be adhered to the inner periphery of the through hole of the sealing body, failing to provide sealing performance. Thus, the curved portion 2c is disposed between the end surface of the capacitor element on the sealing body side and the sealing body, or the height of the sealing body is made longer by the length of the curved portion 2c. That is, the height dimension of the capacitor increases as the length of the curved portion 2c increases. When the curvature radius R exceeds 2.0 mm, difference in stress reduction effect becomes small. Considering stress reduction effect due to the size of the curved portion 2c and increase of the height of the capacitor in the height direction, it is preferable that the curvature radius R of the curved portion 2c to be equal to or less than 2.0 mm.

Similar to the flat portion 2b, the curved portion 2c can be formed by being subjected to compression and deformation by press working using a mold having a predetermined shape.

(Boundary Portion between Inclined Portion and Flat Portion)

Figure 3A:
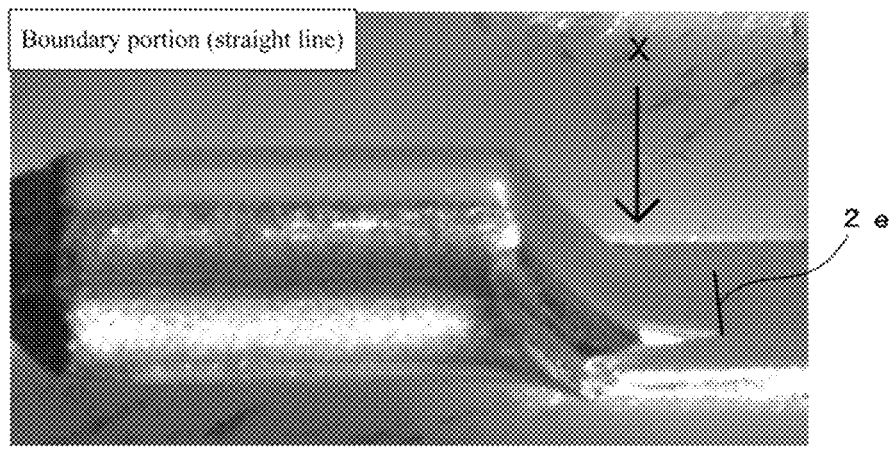
FIGS. 3(a) and 3(b) each show a perspective view of a lead terminal for a capacitor of the invention when a boundary portion between an inclined portion and a flat portion is made to be a straight line.
Figure 3B:
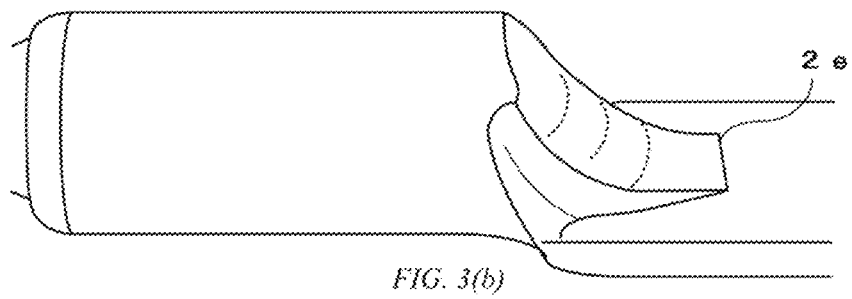
Figure 4A:
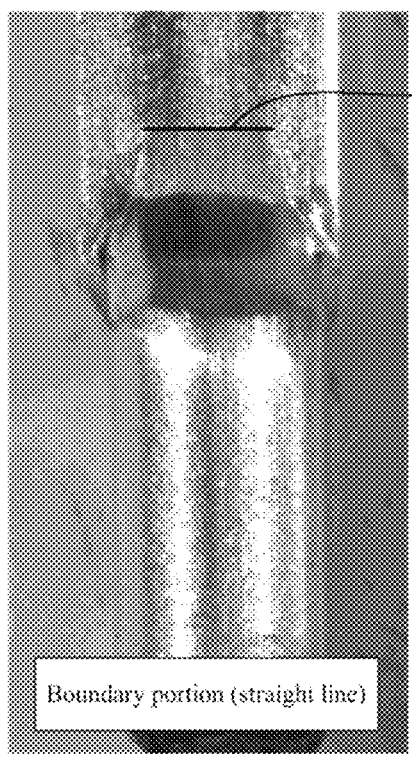
FIGS. 4(a) and 4(b) each show a top view of the lead terminal for a capacitor of the invention when the boundary portion between the inclined portion and the flat portion is made to be the straight line.
Figure 4B:
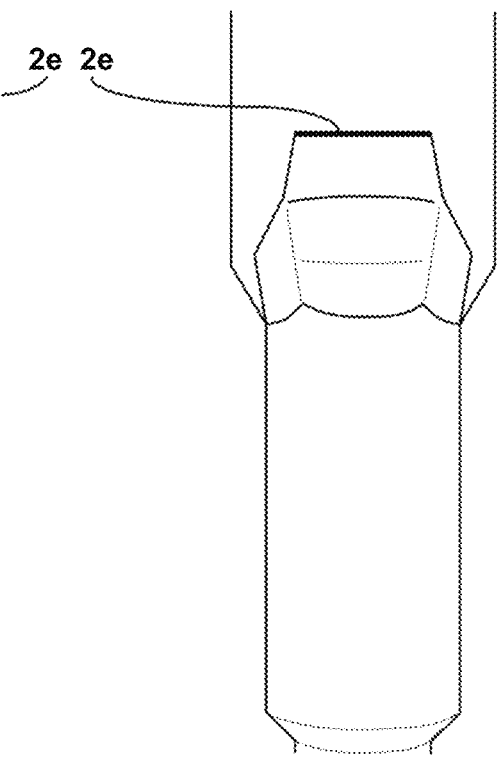
Figure 5A:
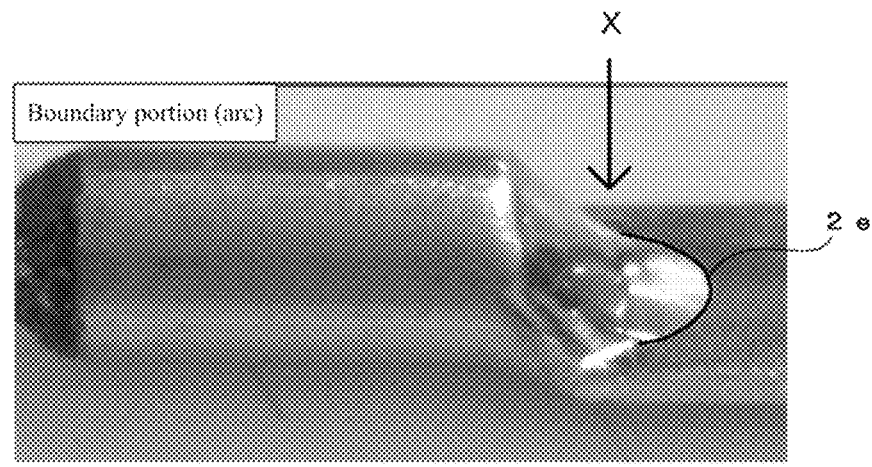
FIGS. 5(a) and 5(b) each show a perspective view of a lead terminal for a capacitor of the invention when a boundary portion between an inclined portion and a flat portion is made to be an arc.
Figure 5B:
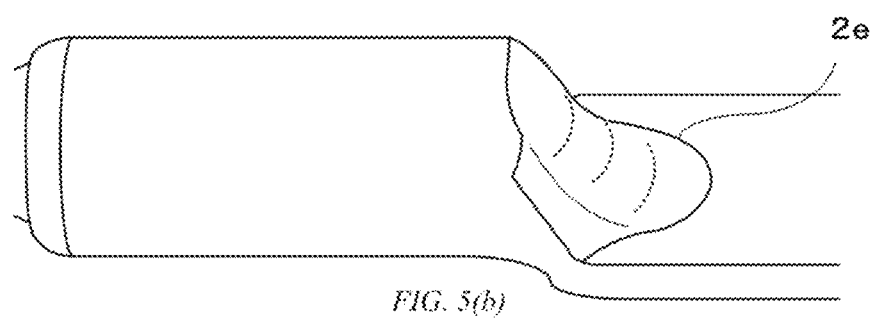

In the lead terminal for a capacitor according to the embodiment, a boundary portion 2e that becomes a boundary between the inclined portion 2d and the flat portion 2b can be made to be a line including a straight line and a curve in plan view of the flat portion 2b. In FIGS. 3 - 6, the inclined portion 2d is formed over the round bar portion 2a and the flat portion 2b. Starting ends A of the curved portion 2c formed on the flat portion 2b are regarded as respective ends of the inclined portion 2d, and the portion where the starting ends A are connected is regarded as the boundary portion 2e. In this case, the boundary portion 2e can be made to have a straight shape or an arc shape in top view of the flat portion 2b and the inclined portion 2d from the upper direction (when viewed from X arrow direction in FIG. 3(*a*) and FIG. 5(*a*), respectively). FIGS. 3(*a*) and 3(*b*) and FIGS. 4(*a*) and 4(*b*) illustrate an example in which the boundary portion 2e between the inclined portion 2d and the flat portion 2b is formed by a straight line in plan view of the flat portion 2b, and FIGS. 5(*a*) and 5(*b*) and FIGS. 6(*a*) and 6(*b*) illustrate an example in which the boundary portion 2e between the inclined portion 2d and the flat portion 2b is formed to include an arc in plan view of the flat portion 2b.

As illustrated in FIGS. 5(*a*) and 5(*b*) and FIGS. 6(*a*) and 6(*b*), making the boundary portion 2e between the inclined portion 2d and the flat portion 2b to be an arc in plan view of the flat portion 2b makes it possible to effectively disperse the stress that will be applied to the boundary portion 2e of the lead terminal for a capacitor as a bending moment during vibration. Furthermore, it is desirable that the diameter L2 of the arc is made to be not less than 60% of the diameter L1 of the round bar portion 2a. When the diameter L2 is less than 60% of the diameter L1, stress dispersion effect may be reduced.

(Method of Manufacturing Lead Terminal for Capacitor)

Next, a method of manufacturing the lead terminal 1 for a capacitor according to the embodiment will be described. The lead terminal 1 for a capacitor can be manufactured by subjecting the aluminum wire 2 to press working by a mold having a predetermined shape to form the round bar portion 2a, the flat portion 2b, the curved portion 2c having a predetermined curvature radius R, and the inclined portion 2d at the same time, and then, making the metal wire 3 contact with the end face of the round bar portion 2a on the side opposite to the flat portion 2b, and connecting them by arc welding or the like.

(Effects)

As described above, in the lead terminal 1 for a capacitor of the embodiment, the curvedly-formed curved portion 2c is provided at the boundary section between the round bar portion 2a and the flat portion 2b of the aluminum wire 2. This makes it possible to disperse stress that will be applied as a bending moment during vibration, delaying fatigue breakage due to vibration. In addition, the following effects can be achieved.

(1) As is apparent from the following examples, making the curvature radius R to be equal to or greater than 0.5 mm makes it possible to dramatically reduce the stress to be applied to the boundary section, improving the vibration resistance by about 20 times.

(2) Differing from the methods described in Patent Literature 1 and Patent Literature 2, the method does not make a structural change to a capacitor element to prevent vibration. Therefore, it is possible to manufacture the capacitor element without changing existing facilities so as to be inexpensive and advantageous in cost.

(3) Improving vibration resistance is possible also by, for example, (a) increasing the thickness, (b) increasing the width, of the lead terminal. However, these methods cause the following problems.

(a) When thickness is made thick

Referring to Table 2 and Table 3 of the following examples, given that the thickness t1 of the flat portion 2b of the lead terminal 1 for a capacitor of Example 1 is 0.27 mm, the maximum stress reduction rate becomes −37.5%. To achieve the value equivalent to this maximum stress reduction rate by using the structure of a conventional lead terminal 5 for a capacitor, the thickness t2 of the flat portion 2b is needed to be increased to 0.43 mm according to another experimental result.

However, when the thickness of the flat portion 2b is made thick, a problem occurs that the connectivity to the electrode foil becomes worse.

That is, as illustrated in FIG. 7(*a*), when the lead terminal 1 is fixed to an electrode foil 12, the flat portion 2b of the lead terminal 1 is made to overlap with the electrode foil 12, a stitch needle 13 is made to pass through the flat portion 2b and the electrode foil 12, and a portion of a long leaf 14a protruded from the back surface of the electrode foil 12 is made to be folded back to tuck the portion in the electrode foil 12 for fixation. Herein, when the thickness of the flat portion 2b of the lead terminal 1 increases from t1 to t2, as illustrated in FIG. 7(*b*), the leaf protruded from the back surface of the electrode foil 12 becomes a short leaf 14b even when the stitch needle 13 is made to pass through to the same position. Therefore, the folded back portion becomes small, failing to sufficiently fix the lead terminal 1 to the electrode foil 12.

Furthermore, also when the lead terminal 1 and the electrode foil 12 are connected by cold welding in which pressing is performed from the electrode foil 12 side overlapped with the lead terminal 1 by a pressing mold, when the thickness of the flat portion 2b of the lead terminal 1 increases from t1 to t2, the pressing force to the connection portion from the pressing mold used for cold welding weakens, weakening the connection strength in some cases.

In contrast, using the lead terminal 1 for a capacitor of the embodiment makes it possible to improve vibration resistance without the above deterioration of the connectivity with the electrode foil 12.

(b) When width is made wide

Referring to the following examples, given that the width of the flat portion 2b of the lead terminal 1 for a capacitor of Example 1 is 1.98 mm, the maximum stress reduction rate becomes −37.5%. To achieve the value equivalent to this maximum stress reduction rate by using the structure of the conventional lead terminal 5 for a capacitor, the width of the flat portion 2b needs to be increased to 2.5 mm according to another experimental result.

However, in the case of a wound type element, increasing the width of the lead terminal makes the element to have an oval shape which deteriorates volumetric efficiency of a case space, and makes the curvature of an electrode foil large at the portion disposed on a corner of the lead terminal, which may cause a crack of the electrode foil.

Thus, using the lead terminal 1 for a capacitor of the embodiment makes it possible to improve vibration resistance while suppressing the crack of the electrode foil described above.

(4) Furthermore, the embodiment makes it possible to further improve the vibration resistance of the lead terminal for a capacitor by appropriately selecting the shape of the inclined portion 2d. That is, making the boundary portion 2e be an arc in plan view on the flat portion 2b as illustrated in FIGS. 5(a) and 5(b) and FIGS. 6(a) and 6(b) makes it possible to radially disperse the stress to be applied to the boundary portion 2e even when vibration is applied thereto, improving the vibration resistance.

(Other Embodiments)

In the above embodiment, the metal wire 3 is connected to the round bar portion 2a after forming the flat portion 2b and the curved portion 2c. However, the timing to connect the metal wire 3 is not limited. For example, the flat portion 2b and the curved portion 2c may be formed by press working after the metal wire 3 is connected to the round bar portion 2a. This order makes it possible to grasp the metal wire 3 when press working is performed to form the curved portion 2c to the lead terminal 1 for a capacitor or when the lead terminal 1 for a capacitor is moved. When the round bar portion 2a is grasped, the surface of the round bar portion 2a may be scratched due to the grasping. This scratch can lower adhesiveness between the through hole surface of the sealing body 8 and the round bar portion 2a to cause electrolytic solution or the like to leak. However, preliminarily connecting the metal wire 3 to the round bar portion 2a as a grasp portion makes it possible to manufacture the lead terminal 1 for a capacitor without grasping the round bar portion 2a, achieving adhesiveness between the round bar portion 2a and the sealing body 8.

Figure 8:
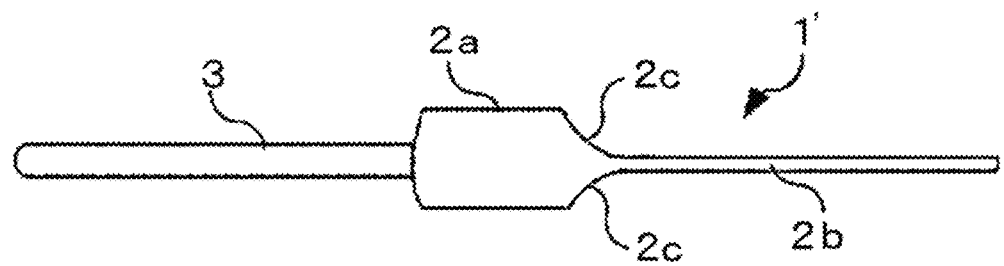
FIG. 8 is a plan view of a lead terminal for a capacitor according to another embodiment of the invention.

In the above embodiment, the flat portion 2b is crushed from only one direction to form the curved portion 2c on only one surface. Alternatively, as illustrated in FIG. 8, a lead terminal 1' for a capacitor having the curved portion 2c at two portions may be formed by crushing the round bar portion 2a to sandwich the round bar portion 2a to form the flat portion 2b at the center of the round bar portion 2a in its diameter direction.

In the embodiment, in the side view of the lead terminal for a capacitor in each of FIGS. 3 - 6 as an example of the shape of the inclined portion 2d, although the example is illustrated in which the inclined portion 2d is linearly decreased in its thickness from the upper side of the round bar portion 2a, this is not limited. For example, in the side view of the lead terminal for a capacitor, instead of forming the inclined portion 2d from the upper side of the round bar portion 2a, the inclined portion 2d may be formed from a position of the round bar portion 2a displaced on the flat portion 2b side. That is, a line is extended in a direction perpendicular to the flat portion 2b from the upper side of the round bar portion 2a, and the inclined portion 2d may be formed from the line. Also in this case, making the curvature radius R equal to or greater than 0.5 mm makes it possible to dramatically reduce the stress to be applied to the boundary portion even when the stress is applied in the direction perpendicular to the lead terminal for a capacitor, improving vibration resistance. Furthermore, forming the boundary portion 2e to include an arc makes it possible to effectively disperse the stress to be applied to the boundary section from a horizontal direction as a bending moment during vibration.

EXAMPLES

Next, effects of the invention will be demonstrated by describing examples of the invention compared with a conventional example and comparative examples.

(Vibration Test)

A round bar having a diameter of 1.9 mm formed of aluminum that has a purity of 99% and that is tempered F material was prepared, the round bar was subjected to press working, and the lead terminal 1 for a capacitor having the flat portion 2a with a width of 1.98 mm and a thickness of 0.27 mm, and having the curved portion 2c with a curvature radius R of 0.50 mm was formed for Example 1.

Figure 10:
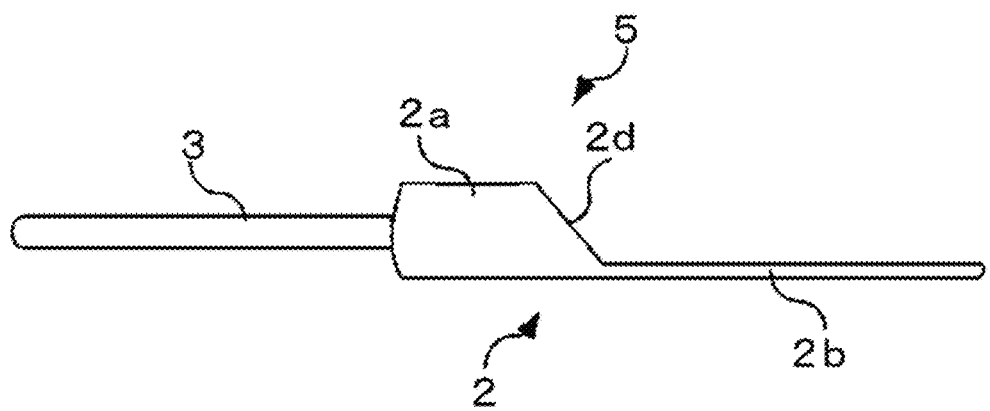
FIG. 10 is a plan view of a conventional lead terminal for a capacitor.

On the other hand, the lead terminal 5 for a capacitor that has the shape having a curvature radius R of 0 mm at the boundary section as illustrated in FIG. 10 and has the flat portion 2b having a similar dimension to the Example 1 was formed for the conventional example.

Next, the lead terminals of Example 1 and the conventional example were used to be applied to respective capacitor elements having a product size of ϕ16×20 Lmm, and vibration test was performed to the capacitor elements, and presence or absence of breakage of the lead terminals was judged. The conditions of the vibration test are as described below.

Frequency: 50, 100, 2000 Hz

Acceleration: 20 G in the case where frequency is 50 Hz, 40 G in the case where frequency is 100 Hz or 2000 Hz.

Sweep Speed: 0.5 oct/min

Vibration Test Time: 6.6 h-11546 h in each of three directions of X, Y, and Z axes Test Sample c: four samples for each direction Test Atmosphere: room temperature In the above conditions in vibration experiment, the sweep speed denotes a speed of continuous change of frequency and acceleration to each point. That is, it means, given that the point of 50 Hz, 20 G is point A, the point of 100 Hz, 40 G is point B, and the point of 2000 Hz, 40 G is point C, the frequency and the acceleration are made to continuously change by the cycle of A→B→C→B→A→B→C→B→A . . . , and the speed between the points is set to 0.5 oct/min as the speed of change.

Figure 11:
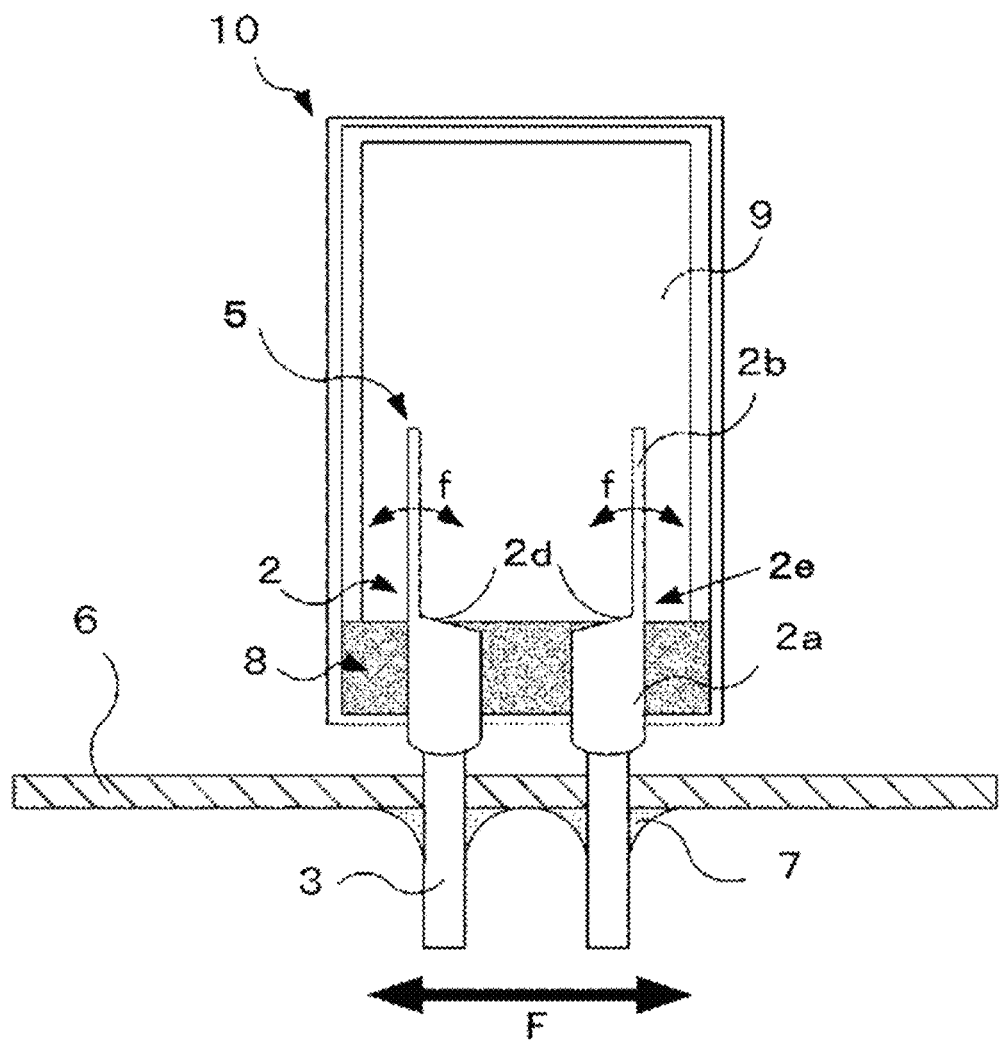
FIG. 11 is a cross sectional view of a conventional electrolytic capacitor.

Furthermore, in the vibration directions in the above vibration experiment, when the capacitor is fixed on a substrate as illustrated in FIG. 11, a direction parallel to a virtual line connecting the lead terminals 5 for a capacitor is X axis, a direction perpendicular to the virtual line is Y axis, and a height direction of the capacitor is Z axis.

Table 1 illustrates results of the vibration test.

TABLE 1

| No | Vibration test time | Conventional example | | | Example 1 | | | Vibration resistance ratio |
|---|---|---|---|---|---|---|---|---|
| | | X axis | Y axis | Z axis | X axis | Y axis | Z axis | |
| 1 | 6.6 | c = 0 | c = 0 | c = 0 | c = 0 | c = 0 | c = 0 | 0.05 |
| 2 | 13.2 | c = 0 | c = 0 | c = 0 | c = 0 | c = 0 | c = 0 | 0.10 |
| 3 | 13.2 | c = 0 | c = 1 | c = 0 | c = 0 | c = 0 | c = 0 | 1.00 |
| 4 | 198 | c = 1 | c = 0 | c = 0 | c = 0 | c = 0 | c = 0 | 1.50 |
| 5 | 359 | c = 0 | c = 0 | c = 0 | c = 0 | c = 0 | c = 0 | 2.72 |
| 6 | 790 | c = 1 | c = 2 | c = 0 | c = 0 | c = 0 | c = 0 | 5.98 |
| 7 | 887 | c = 1 | c = 0 | c = 0 | c = 0 | c = 0 | c = 0 | 6.72 |
| 8 | 1058 | c = 0 | c = 0 | c = 0 | c = 0 | c = 0 | c = 0 | 8.02 |
| 9 | 1320 | c = 0 | c = 0 | c = 0 | c = 0 | c = 0 | c = 0 | 10.00 |
| 10 | 1849 | c = 0 | c = 1 | c = 1 | c = 0 | c = 0 | c = 0 | 14.01 |
| 11 | 1980 | c = 0 | c = 0 | c = 0 | c = 0 | c = 0 | c = 0 | 15.00 |
| 12 | 2206 | c = 0 | c = 0 | c = 0 | c = 0 | c = 0 | c = 0 | 16.71 |
| 13 | 2523 | c = 1 | c = 0 | c = 0 | c = 1 | c = 0 | c = 0 | 19.11 |
| 14 | 4605 | c = 0 | c = 0 | c = 0 | c = 0 | c = 0 | c = 0 | 34.89 |
| 15 | 9210 | c = 0 | c = 0 | c = 0 | c = 0 | c = 0 | c = 0 | 69.77 |
| 16 | 11546 | c = 0 | c = 0 | c = 0 | c = 0 | c = 1 | c = 0 | 87.47 |
| | Number of remained samples | 0 | 0 | 3 | 3 | 3 | 4 | |

In the above table, "c=0" "c=1" and "c=2" denote that the numbers of samples broken after the vibration test are 0, 1, and 2, respectively.

According to the results of the vibration experiment, in the conventional example, when the vibration time is 132 h, one sample was broken in Y axis, and when the vibration time is 198 h, one sample is broken in X axis. Subsequently, when the vibration time is 790 h, one sample was broken in X axis, and two samples were broken in Y axis. Furthermore, when the vibration time is 887 h, one sample was broken in X axis, and when the vibration time is 1849 h, one sample was broken in Y axis and one sample was broken for Z axis, and when the vibration time is 2523 h, one sample was broken in X axis. According to the results, the vibration time to keep good vibration resistance in the conventional example is up to 132 h.

In contrast, in Example 1, when the vibration time is 2523 h, only one sample was broken in X axis, and when the vibration time is 11546 h, only one sample was broken in Y axis. According to the results, the vibration time to keep good vibration resistance in Example 1 is up to 2523 h.

The above results prove that the samples of Example 1 improve vibration resistance ratio by 2523/132 =19.1 times as compared with the samples of the conventional example.

Furthermore, similar to Example 1, a round bar having a diameter of 1.9 mm formed of aluminum that has a purity of 99% and that is tempered F material was prepared, the round bar was applied to press working, and the lead terminal for a capacitor having the flat portion 2b with a width of 1.98 mm and a thickness of 0.27 mm, and having the curved portion 2c with a curvature radius R of 0.25 mm was formed for Comparative Example 1.

Like the vibration test of above-described Example 1, the vibration resistance of the samples of Comparative Example 1 was evaluated. The result of the vibration resistance ratio was 1.77 times as compared with the samples of the conventional example. It is considered that this value is a degree that does not deviate from error range as compared with the value of the conventional example.

According to the above results, it is considered that the curvature radius R equal to or greater than 0.5 mm is preferable.

(CAE Analysis)

The above samples of Example 1 and Comparative Example 1 were subjected to a CAE analysis to measure the maximum stress.

Herein, the computer aided engineering (CAE) analysis is a simulation for calculating the stress applied to the boundary portion by setting the physical properties and the shape such as size of the aluminum structuring the lead terminal 1 for a capacitor, and the magnitude of the force pressing the flat portion 2b from above its flat surface.

Figure 12:
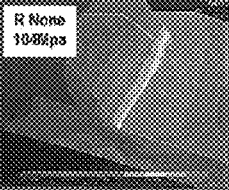
FIG. 12 illustrates Table 2, which show a CAE image, the maximum stress, the maximum stress reduction rate, and the vibration resistance ratio of each sample tested in a CAE analysis.
Figure 12:
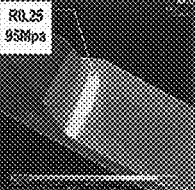
Figure 12:
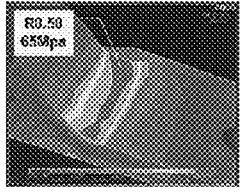

Table 2 (FIG. 12) summarizes the results, showing a CAE image, the maximum stress, the maximum stress reduction rate, and the vibration resistance ratio, of each sample.

The maximum stress reduction rate is a ratio obtained by dividing the value obtained by subtracting the maximum stress in the conventional example from the maximum stress of the target sample by the maximum stress in the conventional example.

The results in Table 2 show that making the curvature radius R of the curved portion 2c to be 0.5 mm makes the maximum stress become 65 Mpa due to stress dispersion, the value indicating that the stress is reduced by −37.5% as compared with the conventional example, improving the vibration resistance by 20 times.

(Change in Curvature Radius R)

Furthermore, lead terminals 1 for capacitor were formed under the conditions similar to those in Example 1 except that the curvature radius R is 1.2 mm (Example 2), 1.5 mm (Example 3), 2 mm (Example 4), 2.5 mm (Comparative Example 2) in the shape illustrated in FIG. 1. Similar to the above-described vibration experiment in Example 1, the maximum stress reduction rate and vibration resistance of the samples of Example 2-4 and Comparative Example were evaluated. Table 3 illustrates the results. Note that the vibration resistance ratio of each of Examples 2-4 and Comparative Example 2 was calculated in the same manner as in Example 1.

TABLE 3

| | Curvature Radius R | Maximum stress reduction rate (%) | Length of curved portion (mm) | Vibration resistance ratio (times) |
|---|---|---|---|---|
| Example 1 | 0.5 | −37.5 | 0.5 | 19.1 |
| Example 2 | 1.2 | −67.7 | 1.2 | 695.5 |
| Example 3 | 1.5 | −70.5 | 1.5 | 981.3 |
| Example 4 | 2.0 | −73.3 | 2.0 | 1282.5 |
| Comparative example 2 | 2.5 | −74.9 | 2.5 | 1346.4 |

The results of Table 3 prove that both the maximum stress reduction rate and the vibration resistance ratio are more improved as the curvature radius R increases.

Figure 9:
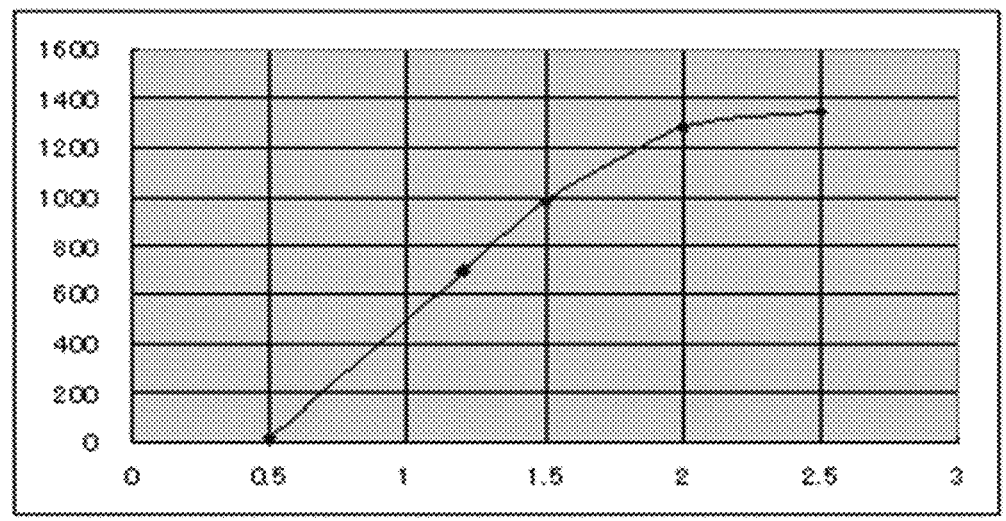
FIG. 9 is a graph illustrating relationship between curvature radius and vibration resistance ratio.

FIG. 9 graphically illustrates vibration resistance ratios in Table 3. Table 3 shows that the difference of the effect of the maximum stress reduction rate becomes small when the curvature radius R exceeds 2.0 mm. On the other hand, the curved portion 2c becomes longer as the curvature radius R increases. Increased length of the curved portion 2c leads to an increase of the space that does not contribute to the capacity in the case, affecting volumetric efficiency of the capacitor. Therefore, it is desirable that the curvature radius R is less than 2.0.

REFERENCE NUMERALS

1, 1' lead terminal for capacitor
2 aluminum wire 2a round bar portion
2b flat portion
2c curved portion
2d inclined portion
2e boundary portion
3 metal wire
5 a lead terminal for a capacitor
6 substrate
7 solder
8 sealing body
9 capacitor element
10 electrolytic capacitor
12 electrode foil
13 stitch needle
14a long leaf
14b short leaf

What is claimed is:

1. A lead terminal for a capacitor comprising:
   an aluminum wire having a round bar portion and a flat portion;
   a metal wire welded to the round bar portion of the aluminum wire; and
   an inclined portion including at least a curved portion at a boundary section between the round bar portion and the flat portion, wherein
   the curved portion has a curvature radius R equal to or greater than 0.5 mm.

2. The lead terminal for the capacitor according to claim 1, wherein the curvature radius R is equal to or less than 2.0 mm.

3. The lead terminal for the capacitor according to claim 1, wherein a boundary portion between the inclined portion and the flat portion includes an arc in a top view of the flat portion.

4. The lead terminal for the capacitor according to claim 3, wherein the diameter of the arc forming the boundary portion is equal to or greater than 60% of the diameter of the round bar portion.

5. The lead terminal for the capacitor according to claim 2, wherein a boundary portion between the inclined portion and the flat portion includes an arc in a top view of the flat portion.

6. The lead terminal for the capacitor according to claim 5, wherein the diameter of the arc forming the boundary portion is equal to or greater than 60% of the diameter of the round bar portion.

* * * * *